INVENTOR.
Frank W. Brooke
BY John E. Hubbell
HIS ATTORNEY

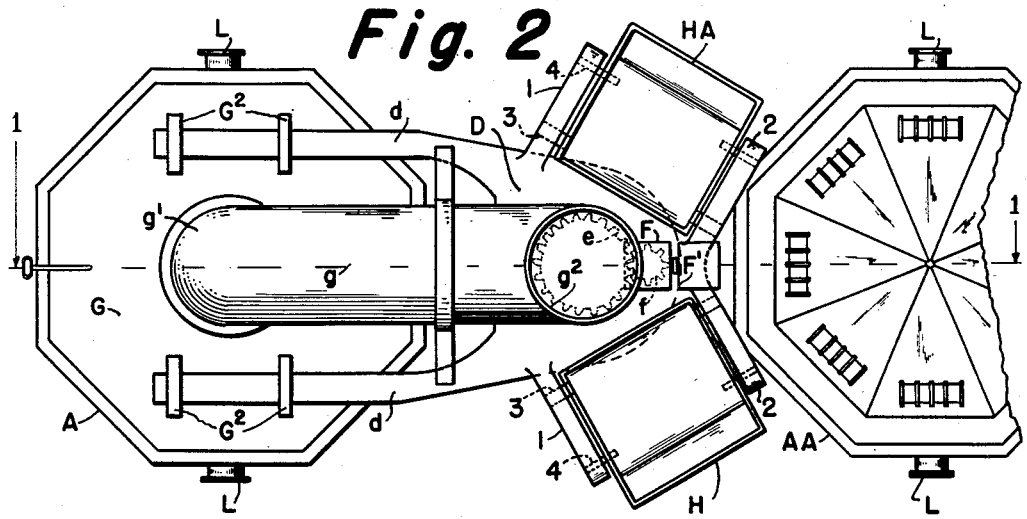
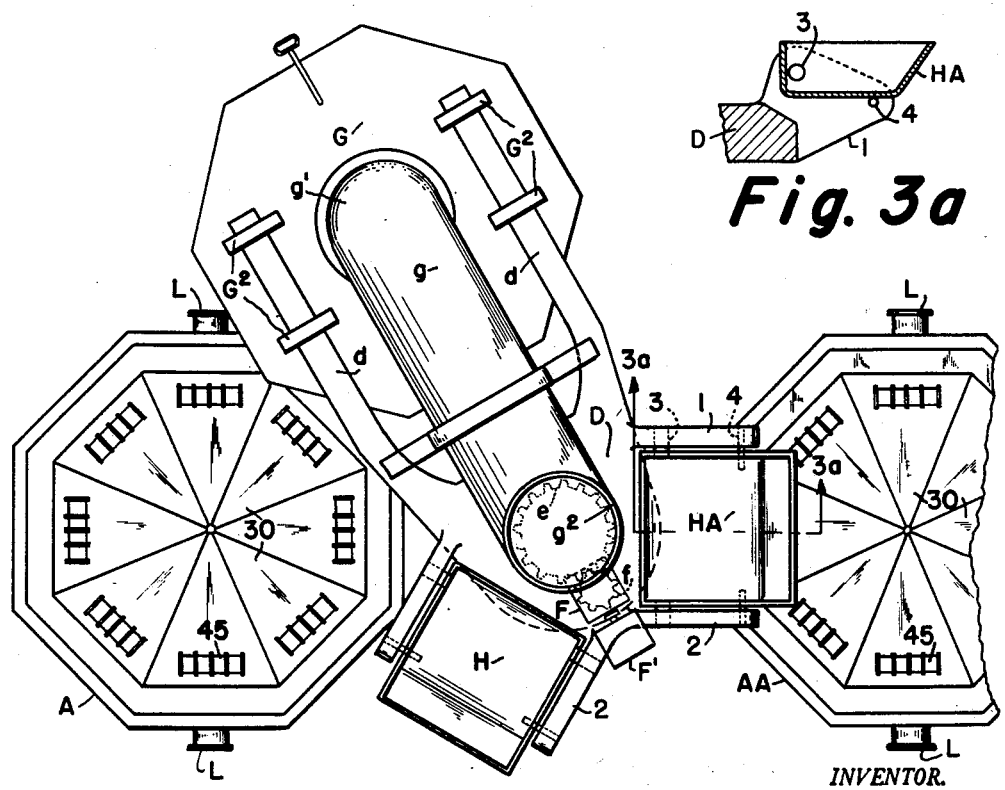

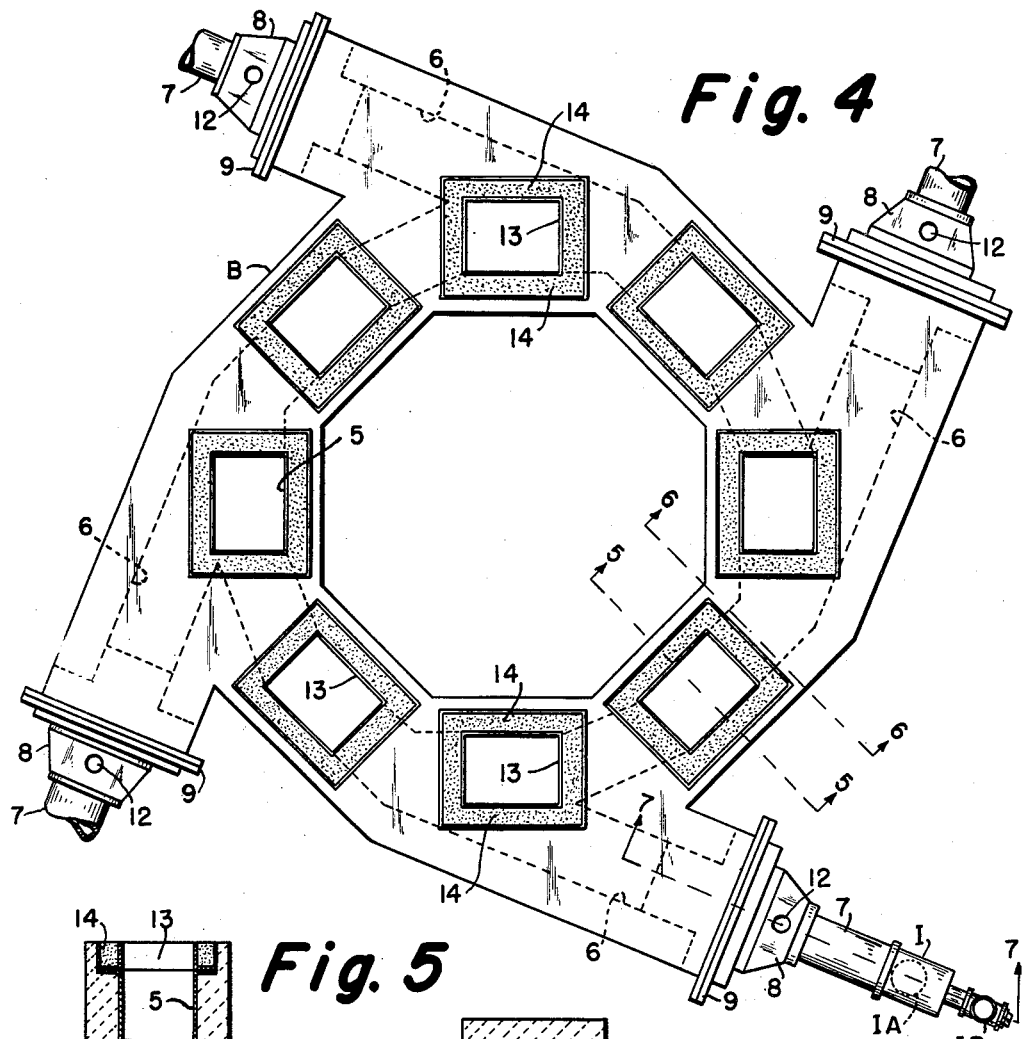
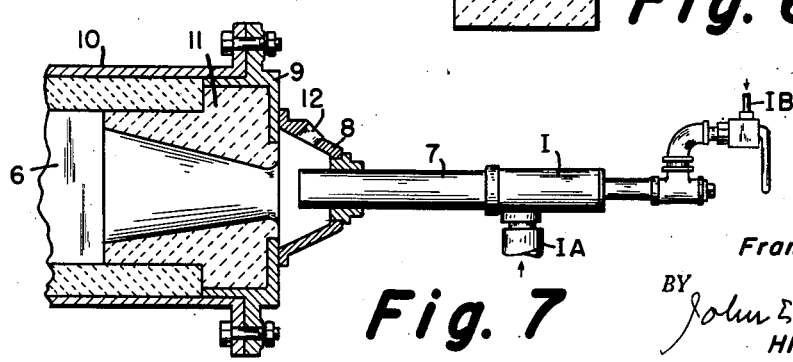

Aug. 27, 1957  F. W. BROOKE  2,804,295
APPARATUS FOR PREHEATING AND CONDITIONING SCRAP METAL
Filed Sept. 19, 1952  5 Sheets-Sheet 4
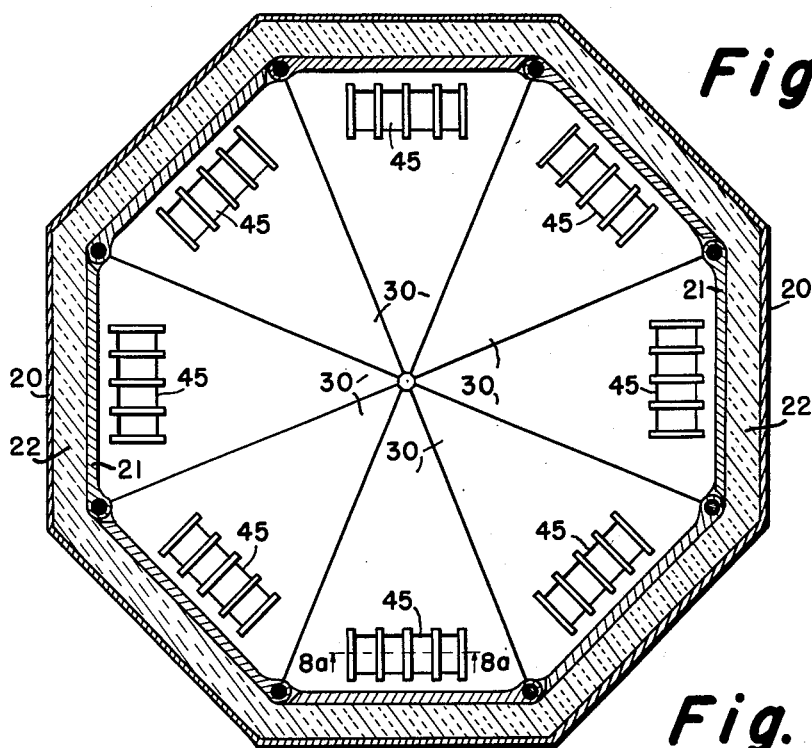
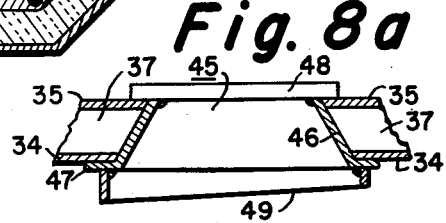
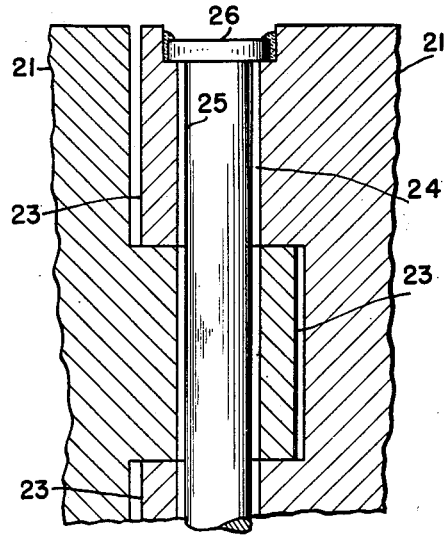
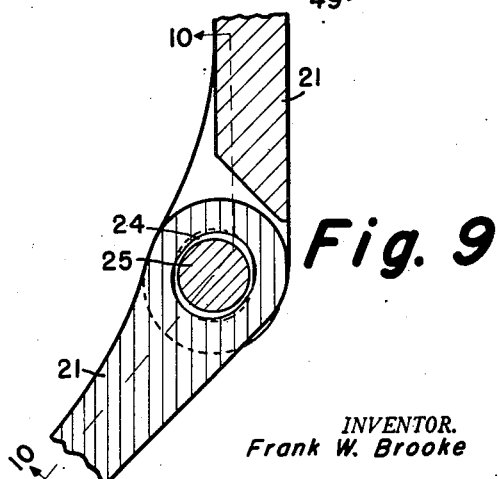
INVENTOR.
Frank W. Brooke
BY John E. Hubbell
HIS ATTORNEY Aug. 27, 1957        F. W. BROOKE        2,804,295
APPARATUS FOR PREHEATING AND CONDITIONING SCRAP METAL
Filed Sept. 19, 1952        5 Sheets-Sheet 5

INVENTOR.
Frank W. Brooke
BY John E. Hubbell
HIS ATTORNEY

United States Patent Office 2,804,295
Patented Aug. 27, 1957

2,804,295

APPARATUS FOR PREHEATING AND CONDITIONING SCRAP METAL

Frank W. Brooke, Pittsburgh, Pa.

Application September 19, 1952, Serial No. 310,477

8 Claims. (Cl. 266—5)

The present invention comprises an improved method of, and improved apparatus for conditioning and preheating scrap metal, commonly called "scrap" in the melting furnace art. The invention is of especial utility in the production of steel in relatively large electric arc furnaces. However, major features of the invention may be used in the production of steel in induction furnaces, and in open hearth and other furnaces, and also in the production of other metals and alloys in electric and other furnaces.

A primary object of the invention is to provide a novel and effective method of, and apparatus for eliminating objectionable foreign matter by heating action from scrap metal, prior to the passage of the latter into the melting furnace. The foreign matter which may advantageously be so eliminated, includes dirt, oil, water, ice, and deleterious elements such as zinc, lead, arsenic, and the like. The last mentioned elements are commonly referred to in the art as "residuals."

Another primary object of the invention is to provide simple and effective apparatus including a charging bucket for preheating scrap metal to a temperature of the order of 1400° F., in said bucket by the combustion of fluid fuel therein, preparatory to the discharge of the preheated metal into an electric melting furnace.

Other major objects of the invention are to provide a simple and effective method of, and apparatus for conditioning scrap metal prior to its introduction into a melting furnace, to deprive the scrap metal of magnetic properties, and to greatly decrease the yield point of the scrap metal so that it can be readily compressed to increase its average density, preparatory to the passage of the scrap metal into a melting furnace. The attainment of each of the two last mentioned objects of the invention require the preheating of the scrap metal to a temperature of the order of 1450° F., and a practically important object of the invention is to effect such preheating by the combustion of relatively cheap fuel which may be either oil or gas.

A practically important object of the invention is to provide a container adapted for use as a scrap preheater, which preferably is in the form of a drop bottom charging bucket for top charge melting furnaces, having a metallic inner wall and adapted for use in heating scrap metal to a temperature of the order of 1450° F., without objectionable warping or corrosion; and which is effectively insulated to minimize heat losses. Preferably, said container is large enough to hold the amount of scrap metal constituting a full charge for an associated melting furnace.

Another practically important object of the invention is to provide a conditioning unit comprising two heater base elements each adapted to support a sepaarte container of the preferred form mentioned above, and to pass fluid fuel and combustion air into the container which it supports through distributed ports in the bottom wall of said preheater. In the preferred mode of use of said unit, scrap metal is preheated alternately in the two containers to a temperature high enough to materially reduce the yield point of the scrap metal and to substantially eliminate its magnetic properties. After the scrap metal has been so heated it is subjected in the same container to a compressing action and as space is thus made available, additional scrap metal may be passed into the container.

Major objects of the invention are obtainable, however, by first preheating and then compressing scrap metal in a single container.

In the preferred form of the conditioning unit comprising two containers and two heater bases, a single preheater cover for movement back and forth between positions in which it engages and forms a cover, first for the container supported by one and then by the container supported by the second of the two preheater base elements. Advantageously, the cover is formed with a gas outlet and an associated gas discharge pipe arranged to discharge spent heating gases and products of combustion into a discharge stack with the cover in its operative position above either preheater base. Advantageously, also, the cover is provided with means for regulating the distribution of the gases passing upwardly into the cover from the subjacent preheater to thereby objectionable "channelling" in said preheater.

The present invention is of especial value for use under conditions now existing, and which recur from time to time, particularly during war periods, in which the demand for scrap metal is greatly in excess of the available supply of high grade scrap metal, so that much inferior grade scrap metal is passed into the melting furnaces. Thus, at the present time a large portion of the scrap metal available for use in melting furnaces is of such character that its average weight per cubic foot is of the order from from 30 to 50 pounds, instead of a hundred or more pounds, as is the case when the scrap metal is of prime quality. At the present time much of the available scrap metal is of such relatively low value, in respect to its physical and chemical characteristics, as well as in respect to its contamination by dirt and other deleterious material, that most steel plants in this country have found it necessary to establish scrap preparation departments in which the scrap is treated and purified. The treatment and purification methods employed in such departments are of such character that the cost ordinarily ranges from $9 to $18 per ton of scrap metal treated, and amounts to from 20 to 40% of the present cost of the scrap metal used in the steel industry, said scrap metal cost being now at an all time high level.

In the present day electric steel practice, a melting furnace charge consists of cold metal which is wholly or largely scrap metal, and which fills the melting furnace chamber to its very top. The scrap metal received and accepted in carload lots has mixed with it painted parts, rusty parts, oil coated parts, water, ice and plain dirt, all of which is fed directly into the melting furnace.

The scrap metal now available includes a relatively large amount of turnings and stampings available at a reduced cost because coated with oil. In some plants oil is burned off of oily scrap in special containers with associated burners, but this involves substantial material and labor costs. In many cases oily scrap is fed directly into the furnaces with a resultant substantial explosion risk, and also a fire hazard risk since preheated oil vapors which then may leak out of the furnace are highly inflammable, and when ignited produce rapidly burning flames which may attain a length of 40 feet or so. Furthermore, under conditions in which the scrap coating oil is burned off in a melting furnace in which the amount of oxygen available for combustion is relatively small, as is typically the case in electric melting furnaces, the oil carbonizes and the carbon formed passes readily into the melting steel, and thus upsets the chemical constitution of the steel produced. While scrap de-oilers are in use as separate equipment in separate departments of some steel plants, their use involves additional labor and cost.

In accordance with the present invention, the oil coating on scrap metal is burned off in the charging bucket by combustion air passed into said bucket, and the products of combustion formed by the combustion of the scrap coating oil pass away from the charging bucket to a discharge stack along with the products of combustion of the air and fluid fuel providing the additional preheating effect desired. By the use of the invention, the scrap coating oil is thus eliminated prior to the passage of the scrap into the melting furnace, and the fuel value of the scrap coating oil is utilized in the preheating operation.

A large portion of the better grade scrap metal now available in this country consists of sheet stamping, trimming, wire and the like, which is regularly prepared for the scrap market by compressing it into bundles. The ease of handling a relatively high ratio of weight to volume of such scrap, makes such scrap a specially desirable form for use in open hearth furnaces in plants having provisions for storing scrap metal in the open. In heating bundles of such scrap in open hearth furnaces, the water or ice content of the bundle presents no particular problem, as the water or ice is rapidly converted into steam which passes away from the furnace to the chimney along with the usual products of combustion. However, when such bundles with their voids filled with water or trapped ice are put into electric furnaces, they constitute a serious hazard because of the rapid rate at which heat is supplied to an electric furnace, and because there is no atmospheric flow through an electric furnace. In consequence, steam is formed and superheated rapidly, and produces explosions which frequently wreck furnace roofs, blow out adjacent windows, and kill or maim operators. In heating bundles of scrap containing water or ice in the charging bucket in accordance with the present invention, the steam formed mixes with the gaseous products of combustion formed in the charging bucket and passing from the latter to the discharge stack, and all risk of dangerous explosions is eliminated.

In melting scrap having an average density or weight of 95 or more pounds per cubic foot, it is regular practice to put the entire charge in an electric steel furnace in a single charging operation. When scrap iron having an average weight of 30 pounds per cubic foot is charged into an electric furnace, the initial charge is much smaller than is required to make a furnace load. In consequence, to properly load the furnace it is necessary to repeat the charging operation as many as three times, as the scrap metal melts and its volume shrinks. Such repeated, so-called "back-charging" operations prolong the furnace heating time and increase the heat required per ton of finished steel. When the scrap is preheated to a temperature somewhat above 1,400° F., the elastic limit or yield point of each piece of scrap is reduced from about 40,000 pounds to about 2,000 pounds per square inch. In consequence, it is readily feasible to radically increase the weight per cubic foot of the scrap metal by compressing the scrap when preheated to suitably lower its yield point.

Another practically important result of passing the scrap metal into the melting furnace at a temperature somewhat above 1,400° F., results from the fact that when at that temperature, the scrap metal has practically no magnetic properties. The elimination of the magnetic properties which the scrap metal has at lower temperatures, expedites the initial heating of the metal in an electric furnace by decreasing the electric heating circuit impedance. When in the ordinary three phase electric arc furnace, the large graphite heating electrodes are lowered into contact with cold scrap metal, they produce rapid local melting effects. In consequence after a period of about ten minutes, each electrode is surrounded by a cold steel scrap mass. The current flow through each electrode normally ranges from 20,000 to 50,000 amperes. The alternating currents flowing through the electrodes induce alternating current flows throughout the entire cold magnetic mass due to the magnetic properties of the latter. The effect of thus including substantially the entire cold magnetic mass of scrap metal in the inductive circuits surrounding the different electrodes is to greatly increase the net heating current circuit impedance. Such impedance increase lowers the kw. to the impressed kva. ratio. This means a reduced power factor, an increase in the cost of the current required to melt the steel, and a resultant considerable increase in the over-all cost of the steel produced. When cold scrap metal is charged into the melting furnace, the high initial heating circuit impedance diminishes as the temperature of the scrap metal increases until the latter attains the critical recalescence or $AC_2$ point at which the mass of scrap metal becomes non-magnetic. The $AC_2$ point is usually in the range of about 1400° F.

I have found that it is readily feasible to eliminate the residuals, zinc, lead, arsenic and the like, by the scrap preheating operation effected in a preheater into which an oxygen containing atmosphere is continuously passed, and from which the vapors and gaseous oxides formed from the residuals are continuously withdrawn. The use of the present invention thus makes unnecessary, the labor and expense of separating residuals from the scrap metal by hand picking. It is also avoids the risk of including the residuals in finished steel which exists when the residuals are passed into a melting furnace. The inclusion of residuals in quality steels adversely affects the physical properties of those steels. This is especially true of steels of the higher grades, such as are used in high speed aircraft.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Fig. 2 is a plan view of unit shown in Fig. 1;

Fig. 3 is a plan view differing from Fig. 2 in the position of the charging bucket cover;

Fig. 3a is a section on the line 3a—3a of Fig. 3;

Fig. 4 is a plan section taken on the line 4—4 of Fig. 1;

Fig. 5 is a section on the line 5—5 of Fig. 4;

Fig. 6 is a section on the line 6—6 of Fig. 4;

Fig. 7 is a section on the line 7—7 of Fig. 4;

Fig. 8 is a plan section of a charging bucket taken on the line 8—8 of Fig. 1;

Fig. 8a is a section on the line 8a—8a of Fig. 8;

Fig. 9 is a reproduction on an enlarged scale of a portion of the charging bucket shown in Fig. 8;

Fig. 10 is a partial section on the line 10—10 of Fig. 9;

Figure 1:
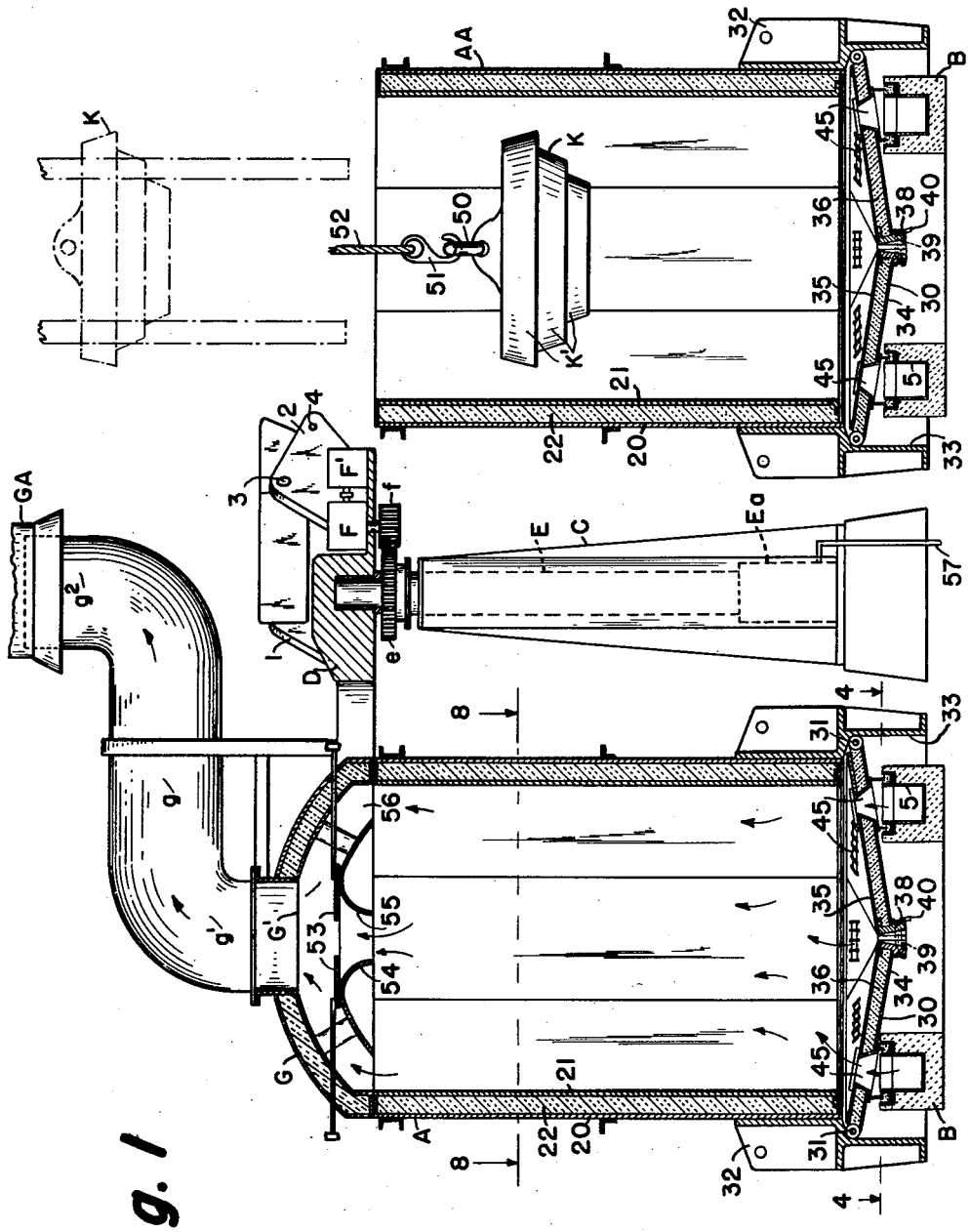
Fig. 1 is an elevation of a conditioning and charging unit in section on the line 1—1 of Fig. 2.
Figure 12:
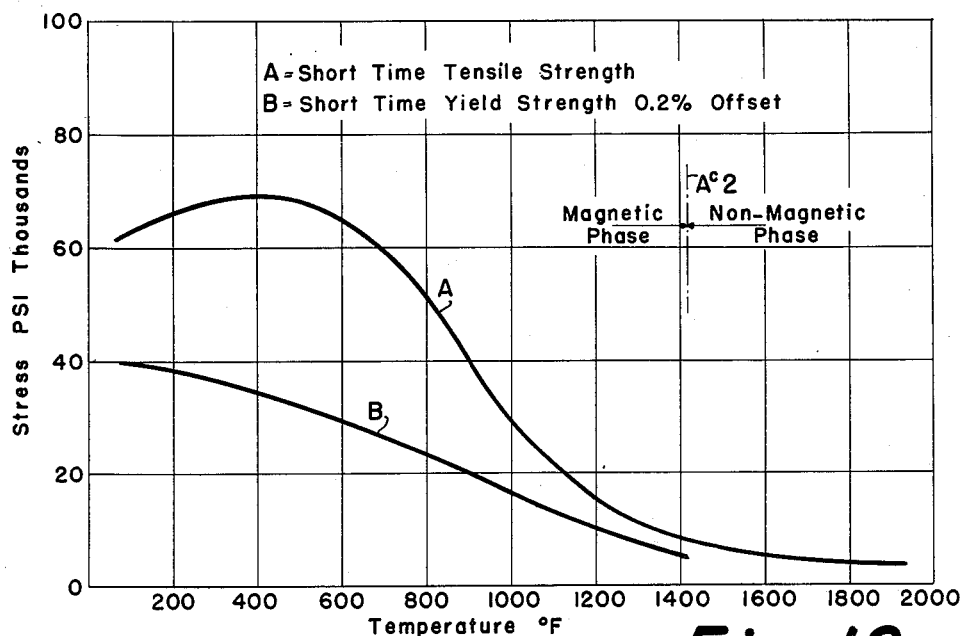
Fig. 12 is a chart illustrating the effects on scrap metal of raising the temperature of the scrap metal from atmospheric temperatures to temperatures in excess of 1,400° F.

In Figs. 1 to 11 I have illustrated by way of example, structural and operating features of a preferred embodiment of the present invention. The apparatus shown comprises a scrap conditioning unit including two scrap metal containers or charging buckets A and AA. The two containers may be, and as shown in Figs. 1–3, are identical in construction, and in their normal uses. In normal use, however, one container is charged with scrap metal which is being preheated during a period in which scrap metal previously charged into and preheated in the other container is being compressed and increased in amount and then charged into a melting furnace. As shown in Fig. 1, the container A contains a charge which is being preheated, and the container AA is having its previously preheated scrap metal content compressed. In Fig. 1, each of the two containers or charging buckets A and AA are removably seated on a separate stationary heater base element B. Each of the two base elements B may be of the type and form collectively illustrated in Figs. 1, 2, 2a, and 3 to 7, and hereinafter described.

As shown in Fig. 1, a vertical column C is located mid-way between the two elements B and charging buckets A and AA. The column C forms a support for a horizontal arm or beam D, which is rotatable about the axis of the column C. The arm D is journaled on the upper end of a vertical shaft E mounted in the column C and supporting a coaxial spur gear e. The shaft E is shown as the non-rotatable piston rod of a hydraulic cylinder Ea mounted in the lower portion of the column C. The gear e is in mesh with a gear f carried by the output shaft of a speed reducing gear unit F. The latter may be of conventional form and is adapted to be rotated by a motor F' when the latter is energized. The motor F' and gear unit F are supported on the end of the arm D at one side of the shaft E. The other end of the arm D supports a cover or hood G which is shown in Fig. 1, as resting on, and closing the upper end of the charging bucket A. By rotating the arm D through an angle of 180°, the cover G may be moved into a position above the bucket AA. The latter may then be used in preheating cold scrap in the bucket AA. The cylinder Ea is adapted for use in lifting the cover G up from a container resting on one of the heater base elements B and thereafter lowering said cover into engagement with the container resting on the other element B. The cover G as shown, is in the form of a dome with a central outlet G' for spent heating gases, and supports a bent smoke stack g. The latter comprises a vertical depending end portion g' in register with the outlet G', and an uprising end portion g² coaxial with and shown as extending into the lower end of a vertical stationary smoke stack GA coaxial with the shaft E.

As shown, the end of the arm D supporting the cover G is formed with bifurcations d which straddle the cover outlet at lower end of the smokestack g, and extend through apertured brackets G², secured to and extending upward from the cover G. With the cover G connected to the arm D described, it is readily possible to disconnect the cover from the arm D when this is necessary or desirable, for repair or other purposes.

As shown, the end of the arm D remote from the cover G, supports one or more trays for use in adding scrap to the container in which scrap metal has been or is being compressed and thereby provides empty container space into which scrap metal is desirably passed. As shown, there are two such trays, H and HA. Each tray is pivoted to turn about a corresponding pair of pintles or pivot pins 3, carried by the corresponding bracket arms, and each tray may be locked in a horizontal load retaining position by pins 4 extending through the corresponding arms 1 and 2, and movable into and out of the positions in which they engage and support the bottom of the corresponding tray. Each of the trays H and HA may be angularly displaced from one another as shown in Figs. 2 and 3, so that with the cover G in place over one container A, the two trays will be at opposite sides of the other container AA, and neither tray will extend over said container.

However, by rotating the arm D about the shaft E clockwise as seen in Fig. 2, through an angle of a little more than 50°, the tray HA will occupy the position shown in Fig. 3, in which it may tilt and discharge into the container AA when the corresponding pins 4 are withdrawn. Conversely when the member D is turned counter-clockwise as seen in Fig. 2, through an angle of a little more than 50°, the tray H will be in position to discharge into the container AA. As will be apparent, however, additional scrap may be added to the preheated scrap charge in the container not under the cover G, without adjustment of the cover G, as by means of suitable overhead mechanism. The latter may include a charging bucket which may be suspended from an overhead crane and may be substantially smaller than the buckets A and AA. The scrap metal thus supplied to the container containing preheated compressed scrap metal, may or may not be preheated.

The heater bases B may each be of the form shown in Fig. 4, including an annular passage or space 5 surrounding the vertical axis of said base and with a plurality of horizontal burner inlet passages 6, opening tangentially into portions of the annular channel 5 displaced about said axis. Each burner inlet receives a combustible mixture of fluid fuel, which may be oil, or gas, and combustion air from a corresponding atomizing fuel burning. The burner I shown in Figs. 4 and 7, has inlets IA and IB, respectively supplying air and oil under pressure, and has a discharge tube 7 coaxial with the corresponding inlet passage 6. In the conventional construction shown, each burner pipe 7 extends through the small end of a conical metal casing element 8 attached to a metal end casing member 9 which is detachably connected to a metal casing 10 surrounding a refractory lining or inner wall for the corresponding passage 6. The casing member 9 also holds in place a conventional Venturi type refractory burner block 11 coaxial with the passage 6 and the pipe 7. The casing section 8 has an air inlet opening 12, to serve the conventional purpose of supplying atmospheric air to re-ignite the mixture of air and gas or atomized oil discharged by the burner I, when the burner flame blows off. Inasmuch as the burner I may be of well known conventional form, it requires no further description. The passage or space 5, as well as the inlets 6 may be surrounded by refractory walls advantageously reinforced by having outer metallic casing walls. The number of the burner inlet portions 6 for each heater base B is a matter of designer's choice. As shown in Fig. 4, the base B has four such inlet portions.

The annular passage 5 in each heater base B is formed with a plurality of outlet ports 13 at its upper side. As shown there are eight regularly spaced ports 13 in the upper wall of each annular passage 5. As shown, each port 13, comprises a vertically disposed portion above the top wall of the passage 5. The port 13 is rectangular in cross section, and is provided at its upper end with a sealing sand space 14. The latter has a metal wall in the form of a trough open at its top.

As hereinafter explained, each port 13 is adapted to pass a combustible mixture of air and gas or atomized oil into the container A or AA above said port 13 through a port in the bottom wall of the container. The containers A and AA may take various structural forms. In the preferred construction shown, the vertical body portion of each container wall is octagonal in horizontal cross section. As is shown best in Fig. 8, the octagonal body portion of the container A comprises a plurality of flat outer vertical metallic wall sections 20, and a plurality of flat vertical inner metallic sections 21, and heat insulation material 22 filling the space between the inner and outer metallic walls. The outer wall may be formed of integrally connected cast steel sections, but preferably is a welded steel plate structure. The inner wall sections 21 are formed of a steel alloy material having high tensile strength at temperatures as high as 1,500° F. In practice, the wall sections 21 may well be formed of the alloy comprising 18% chromium, 8% nickel and a small amount of columbium, and commercially known as the 18–8 Cb alloy. That alloy may be obtained in a plate or cast metal form, and has a coefficient of thermal expansion nearly 30% greater than the ordinary steel in the outer wall 20. In operation, the inner container wall section 21 will attain a temperature of 1200° F., or so, above the temperatures of the outer metallic wall sections 20. Thus there is a relatively large linear expansion of the inner wall sections 21 relative to the outer wall 20.

To accommodate the relative horizontal expansion and contraction of the wall sections, the adjacent side edges of each adjacent pair of sections 21 are loosely connected so that each of said edges is permitted a limited movement toward and away from the adjacent edge. In the preferred construction illustrated in Figs. 8, 9 and 10 each side edge portion of each section 21 is thickened and slotted to form a vertical row of spaced apart, aligned, hollow hinge knuckles 23. The hinge knuckles at each side of each section 21 alternate with the hinge knuckles of the adjacent sections 21, as is shown in Fig. 10. The aligned passages 24 in the adjacent edge rows of hollow knuckles 23 of each two adjacent sections receive a corresponding hinge pintle 25, having an enlarged head 26 at its upper end. Each such head may be received, as shown, in a recess formed in the upper side of the uppermost knuckle. The pins 25 may be circular in cross sections, but the knuckle passages 24 may well be oval in cross section, with the major diameters of the passages in the adjacent rows of knuckles extending in the general direction of the relative expansion and contraction movements of said rows. The minimum diameter of each knuckle passage 24 is appreciably greater than the diameter of the corresponding pin 25.

Each two adjacent sections 21 are thus connected by a piano forte type hinge which permits the relative movement of the sections needed to avoid objectionable expansion and contraction.

Each of the containers A and AA in the form shown comprises a normally closed bottom wall in the form of an inverted, sectionalized cone, coaxial with the container and having its apex slightly below the cone base, so that the cone angle is of the order of 160°. That angle is not critical however. The container bottom wall, in the construction form shown, comprises a plurality of flat, wedge shaped sections or leaves 30. Advantageously and as shown, there are as many bottom sections 30 as wall sections 21, and each bottom section 30 has its wide end adjacent the lower ends of each adjacent pair of vertical wall sections 20 and 21. Each of the bottom sections 30 shown, is pivoted to turn relative to the container body about a horizontal pintle or shaft 31, between its collapsed, discharge position shown in Fig. 11, and its normal bottom closing position shown in Figs. 1, 2, 3 and 8. As shown in Fig. 1, the lower end portion of each container body is reinforced by a metallic structure which may be a steel casting or a welded or riveted structure 32. Said structure comprises an uprising octagonal portion welded or riveted to the lower portion of the outer container wall, and a lower octagonal portion 33 which surrounds the container bottom wall sections or leaves 30, when the latter are in their bottom closing position as shown in Fig. 1. The form of the reinforcing structure 32, need not be described in further detail as it may be similar to the corresponding structure heretofore employed in charging buckets used to discharge cold scrap into open top furnaces.

Figure 11:
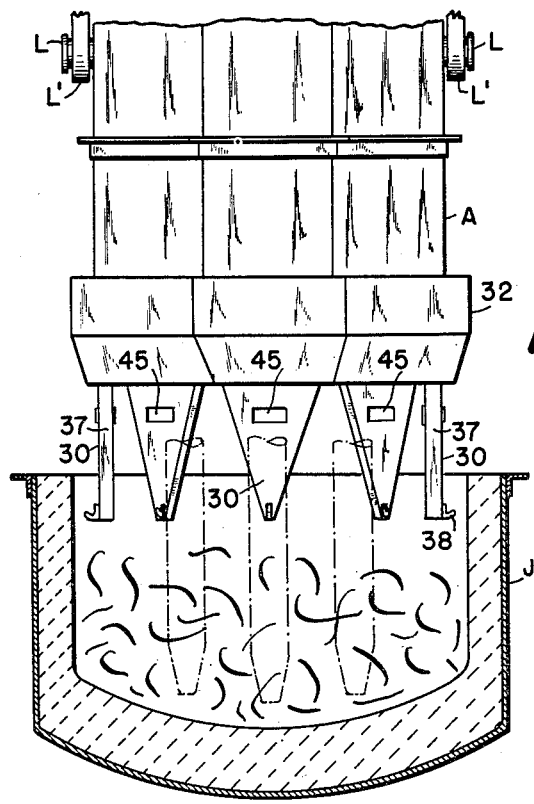
Fig. 11 is an elevation partly in section illustrating a furnace charging operation.

As shown in Fig. 1, each of the bottom leaves 30 comprises a lower or outer metallic wall 34 and an upper or inner metallic wall 35. The walls 34 and 35 are spaced apart to provide a space filled with heat insulation material 36. The walls 34 and 35 may be formed of the same metallic materials as the container outer and inner wall portions 20 and 21, respectively. The side edges of each pair of bottom wall sections 34 and 35 are connected by metallic parts 37 which are transverse to the walls 34 and 35, and hold the interposed insulation in palce. The edge sections 37 of each bottom wall section or leaf 30 may well be formed by transversely bent extensions of the corresponding wall portions 35. As shown, each bottom wall section 30 is provided at its inner end with a hook portion 38, depending from the bottom wall when the latter is in its closed position, as shown in Fig. 1, for use in detachably holding the inner ends of the bottom sections together in the normal operation of the container. The connecting means shown is in the form of a chain 39, surrounding the hooks, as shown in Fig. 1, and having its ends connected by a coupling pin 40, which may be readily removed to permit the bottom wall sections 30 to turn into their depending positions, shown in Fig. 11, when the contents of the container are to be discharged into a subjacent melting furnace J, as shown in Fig. 11. As shown, the locking chain 39 is loosely connected to one of the bottom sections 30, and the locking pin 40 may be connected to a suitable retrieving element, which may be a light-weight pull-chain, or a rod which may be hook connected to the pin 40.

Each container bottom wall section 30 is formed with a port 45 adapted to register with an immediately subjacent port 13 of the heater base supporting the container. As shown, the port 45 is surrounded by a wall element 46 in the form of a hollow truncated cone with an outwardly extending flange 47 at its base, which engages the outer side of the corresponding plate 34. As shown, parallel spaced apart bars 48 extend across the upper end of each port 45 with their ends in engagement with the adjacent portion of the corresponding wall 35. The parts of the bars 48 engaging the upper end of the wall member 46 may be welded to the latter. The member 46 may be formed of the same high temperature resisting metal as the wall sections 21 and plates 35. A metallic sealing member 49 extends from the underside of the flange 47 into the sand in the sealing space 14, surrounding the subjacent outlet port 13, thus providing a readily separable gas tight connection between each port 45 and the subjacent port 13. The sealing member 49 may be in the form of an open-ended hollow rectangular box, and may have its upper end welded to the flange 47 of the corresponding wall member 46.

The desired scrap compressing effect in a container holding preheated scrap metal and having its upper end open, as does the container AA shown in Fig. 1, may be effected by dropping a suitably shaped and suitably heavy weight K on the metal to be compressed, from a level a few feet above the scrap metal. As shown by way of example in Fig. 1, the weight K is circular and comprises a plurality of sections K' which decrease in diameter with the distance from the top of the weight K. The latter is shown as provided with a simple link 50 for engagement by a hook 51 suspended by a cable or chain 52 from an overhead crane, not shown. If the diameter of each container is 10 feet or so, as may well be the case, the weight K may have a diameter of 8 feet, and may well weigh two thousand pounds. As previously explained, when ordinary scrap metal is preheated to a temperature of 1,450° F., or so, the elastic limit or yield point of the scrap metal pieces is reduced from about 40,000 to about 2,000 pounds per square inch, and the average reduction in the yield point of the mass of scrap metal is of the same order. When necessary, the weight K may be repeatedly raised above and dropped into engagement with the scrap metal to be compressed. The use of the weight K on the preheated scrap is effective to increase its average scrap density from 30 to 50 pounds per cubic foot, to a density per cubic foot of 90 to 110 pounds.

To facilitate the movement of the cover G into and out of engagement with the upper ends of the containers resting on the heater bases B, as previously noted, the shaft E may be connected to, or serve as the piston stem of a hydraulic cylinder Ea mounted in the lower portion of the column C. As diagrammatically indicated in Fig. 1, the hydraulic cylinder may be provided with valved piping 57 for passing oil or other pressure fluid into, and for discharging said fluid from the lower end of the cylinder Ea. The cylinder Ea thus serves to raise the cover G above, and lower it into engagement with a subjacent container. To facilitate the adjustments of the arm D and container G, the mechanisms F and F' and the trays H are advantageously secured to the end of the arm D at the opposite side of the axis of the column C from the cover G, to counter balance more or less of the weight of the latter.

The container elements A and AA are ordinarily arranged for movement into and out of engagement with the heater bases B, and into and away from their discharge positions, by overhead crane mechanism in the customary manner in which large charging buckets are ordinarily handled. To this end each container may be provided with diametrically opposed trunnion pivot elements L, suitably attached to the outer wall 20 of the container at a level above the center of gravity of the container. The trunnion pivots are pivotally connected to the depending legs L' of a yoke, or other customary suspending elements which need not be illustrated or further described herein as they may be of known type.

In the contemplated normal use of the two-container unit shown in Fig. 1, during the period in which one container, A as shown, contains scrap metal being preheated, scrap metal, in the other container, AA, previously preheated to a temperature of about 1450° F., is compressed and increased in amount and is thereafter discharged into a melting furnace as is illustrated in Fig. 11. In the above mentioned use of the apparatus shown in Fig. 1, the cover G is used at the top of each container when scrap metal is being preheated therein. The container thus emptied may then be put back of the heater base B on which it rested while the charge just emptied was compressed. Alternatively the last mentioned container may replace the container preheated on the other heater base. In either case the scrap metal to be preheated is charged into the emptied container.

As previously explained, scrap metal at a temperature of the order of 1,450° F., has an elastic limit, or yield point, which is only about 5% of what it is when the same scrap metal is at atmospheric temperature. In consequence, a weight of moderate size dropped onto the heated scrap from an elevation of a few feet is effective to compress the scrap from the undesirably low density of 30 to 50 pounds per cubic foot to the desirably high density of from 95 to 110 pounds per cubic foot, or to some intermediate value as conditions make desirable.

The desirability of increasing the density of scrap metal weighing from 30 to 50 pounds per cubic foot is so well recognized that highly developed and very expensive equipment has been provided heretofore to compress scrap metal at room temperature to the relatively limited extent possible under such conditions. According to my information and belief, however, the method of, and apparatus for producing the scrap metal compacting effect, disclosed and claimed herein is novel and much superior to the compacting method of and apparatus heretofore proposed. An important practical advantage of my scrap metal compacting procedure is that with the compacting operation carried out in the charging bucket, there is no need for movement of scrap metal into or out of the charging bucket which would not be required if the charging bucket were used merely to feed cold scrap metal into a melting furnace.

As will be apparent, the heating of the scrap metal effected in the charging buckets with their heat insulating walls, involves a minimum heat radiation loss. Furthermore, the method of heating permits the efficient use of relatively cheap fuel gas or oil, and insures a volume and distribution of gas flow through the scrap heating container which rapidly discharges to the stack the gases and vapors developed in the scrap preheating operation. In consequence, those gases and vapors can subject the metal treated to no adverse effects. The temperature attained in the scrap heater is high enough either to substantially eliminate from the scrap metal all objectionable foreign matter or to convert that matter into material which will be included in relatively innocuous slag formed in the melting furnace.

Heater bases B of the form shown in the drawings are simple and practically effective for their intended purpose. Even though the pressure of the combustible mixture in the conduit 5 is only that required to move the burning gases upward through the scrap metal charge in the preheating container at a suitable speed, "channeling" or improper flow distribution in the preheating container can be quickly and effectively corrected by suitable adjustment of the dampers 53 mounted in the hood or cover G. Those dampers act to vary the relative rates of flow past the metallic baffle 54 through its central passage 55 and its peripheral passages 56 from the body of the corresponding container A or AA.

When cold scrap metal is passed into a steel melting furnace from which a charge of finished steel has just been tapped off, the temperature of the scrap metal rises rapidly as a result of its absorbtion of a large quantity of heat from the furnace bottom and lining, which are usually at a temperature of about 2800° F. This rapid initial heating of the cold scrap in the melting furnace is sometimes referred to as "false preheat." All of the heat absorbed from the furnace bottom and lining must be returned during the operation of melting and finishing the scrap metal charge. The heat absorbtion from the furnace wall creates a "cold bottom" which is a bad condition in any steel melting unit. Moreover the heat return of the cold scrap must be effected by electric heating current which for a given heating effect is much more expensive than the fuel burned in preheating scrap metal in accordance with the present invention.

The preheating of the scrap metal by a source of heat less expensive than electric current has long been recognized as a desirable result of practically attainable. Heretofore, I among others, have unsuccessfully attempted to obtain that result by preheating scrap metal in a melting furnace chamber by the combustion of fuel passed into the chamber. In my attempts to so preheat scrap metal, I found that when the melting furnace is substantially full of cold scrap, there is insufficient free space in the furnace for the scrap metal and for the combustion of the fuel. The lack of adequate free space prevents the development of flames which can be maintained and which will permeate the mass of scrap, as is essential to the development of an adequate amount of heat in the furnace, and the attainment of a suitably uniform heating effect.

Attempts made from time to time to preheat the scrap metal in a separate furnace or container preparatory to the transfer of the preheated metal to a melting furnace have not been commercially successful for various reasons. The time and crane facilities needed are not available for the transfer of the scrap metal from a stationary preheating furnace or container to a melting furnace, during the relatively short charging period permissable in the operation of an ordinary high output, electric melting furnace. Furthermore, the loss of heat in transferring the preheated scrap metal from a stationary preheating furnace or a container to a melting furnace is objectionably large and increases as the weight of the scrap metal per cubic foot decreases. With scrap of the character now available weighing from 30 to 50 pounds per cubic foot, the relatively large ratio of scrap surface to scrap mass, results in a rapid cooling action.

The use of the present invention in which the preheating and compacting of light-weight scrap metal are each effected in a single drop bottom charging bucket having an inner wall formed of metal not adversely affected when heated to a temperature of 1500° F., and which is effectively insulated against heat losses, are not attainable with methods or apparatus heretofore developed gives new and useful results of major importance which have not been attained heretofore.

While in accordance with the provisions of the statutes, I have illustrated and described the best form of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. A charging bucket for use in preheating scrap metal charges successively introduced into said bucket to a temperature of the order of 1,400° F.–1,450° F., comprising means for passing a burning mixture of fluid fuel and combustion air into the lower portion of said charging bucket and withdrawing gaseous products of combustion at its upper end, said bucket having an inner metallic wall formed of metallic material resistant to temperatures of the order of 1,500° F., heat insulation surrounding said inner wall, and in which the adjacent sections of the inner wall are formed each with spaced apart hinge knuckles, each pair of adjacent hinge knuckles of each hinge section having their adjacent ends overlapping a hinge knuckle portion of the adjacent section, said overlapping knuckles being perforated, and a locking bar extending loosely through the perforations of the hinge knuckle portions of adjacent sections.

2. Apparatus for preheating scrap metal and converting it into steel in a melting furnace comprising a drop bottom charging bucket formed with ports in its bottom wall and a heater base unit comprising a mixing chamber with top wall ports arranged to register with the bottom wall ports in said bucket, means for passing fluid fuel and combustion air into said chamber under pressure and thence into said charging bucket.

3. Apparatus for preheating scrap metal and converting it into steel in a melting furnace comprising two drop bottom charging buckets each formed with inlet ports in its bottom wall, two spaced apart heater base units each comprising a mixing chamber with top wall ports and each adapted to support either of said charging buckets with its outlet ports in register with the inlet ports of the charging bucket which it supports, and means operable to supply fuel and combustion air alternately to said heater base units.

4. Apparatus for preheating scrap metal and converting it into steel in a melting furnace comprising two drop bottom charging buckets each formed with inlet ports in its bottom wall, two spaced apart heater base units each comprising a mixing chamber with top wall ports and each adapted to support either of said charging buckets with its outlet ports in register with the inlet ports of the charging bucket which it supports, means operable to supply fuel and combustion air alternately to said heater base units, and a cover provided with an outlet for products of combustion, and means for moving said cover back and forth between two spaced apart positions respectively above the two units, and arranged when in position above either unit to pass products of combustion away from that unit.

5. Apparatus as specified in claim 4, including supporting means for said cover on which said cover is mounted for rotative movement about an axis similarly displaced from each of said units and including a pipe rotating with said unit and having one end in register with the cover outlet and having its other end in register with said smoke stack.

6. Apparatus for preheating scrap metal comprising a pair of spaced apart heater bases formed with outlets for burning gases and vapors, a separate container mounted on each base and formed with ports in its bottom wall registering with the first mentioned ports, a supporting element having an axis similarly displaced from said bases, a crane mounted on said element for rotation about said axis, a container cover supported by said crane arm for movement by the latter into register with the upper end of either container, and having an outlet for combustion gases, a smoke stack having an open lower end above said column, and a conduit supported by said crane arm and arranged to receive gases from said cover outlet and discharge them into said smoke stack.

7. Apparatus as specified in claim 6, including means mounted in said supporting element for raising and lowering said crane arm.

8. Apparatus as specified in claim 6, in which said crane arm supports a receptacle for make-up scrap metal adapted to discharge said make-up metal into a container mounted on one of said bases.

References Cited in the file of this patent

UNITED STATES PATENTS

| | | |
|---|---|---|
| 105,267 | Smith | July 12, 1870 |
| 499,188 | Giroux | June 6, 1893 |
| 975,751 | Conley | Nov. 15, 1910 |
| 1,126,028 | Kekich | Jan. 26, 1915 |
| 1,526,400 | Waldmann | Feb. 17, 1925 |
| 1,708,509 | Loshbough | Apr. 9, 1929 |
| 2,296,380 | Davidson | Sept. 22, 1942 |
| 2,338,617 | Baker | Jan. 4, 1944 |

FOREIGN PATENTS

| | | |
|---|---|---|
| 520,670 | Great Britain | Apr. 30, 1940 |